US008894297B2

(12) United States Patent
Lee

(10) Patent No.: US 8,894,297 B2
(45) Date of Patent: Nov. 25, 2014

(54) ACTIVE OPTICAL CABLE WITH AN ADDITIONAL POWER CONNECTOR, AND ELECTRONIC DEVICE USING THE SAME

(75) Inventor: Sheng-Yuan Lee, New Taipei (TW)

(73) Assignee: Via Technologies, Inc., New Taipei (TW)

( * ) Notice: Subject to any disclaimer, the term of this patent is extended or adjusted under 35 U.S.C. 154(b) by 0 days.

(21) Appl. No.: 13/588,558

(22) Filed: Aug. 17, 2012

(65) Prior Publication Data

US 2013/0129283 A1 May 23, 2013

(30) Foreign Application Priority Data

Nov. 23, 2011 (TW) ................................ 100142881

(51) Int. Cl.
*G02B 6/38* (2006.01)
*H01R 13/66* (2006.01)

(52) U.S. Cl.
CPC .................................... *H01R 13/665* (2013.01)
USPC ............................................... 385/53; 385/94

(58) Field of Classification Search
USPC ...................................................... 385/53–94
See application file for complete search history.

(56) References Cited

U.S. PATENT DOCUMENTS 7,182,646 B1 * 2/2007 Chou et al. .................... 439/660
7,415,367 B2 * 8/2008 Williams ........................ 702/59
7,788,050 B2 * 8/2010 Williams ........................ 702/59
8,403,571 B2 * 3/2013 Walker ............................ 385/88
8,824,838 B2 * 9/2014 Walker ............................ 385/14
2004/0245995 A1 * 12/2004 Williams ...................... 324/512
2007/0237470 A1 * 10/2007 Aronson et al. .............. 385/101
2008/0319689 A1 * 12/2008 Williams ........................ 702/59
2010/0046891 A1 * 2/2010 Sabo .............................. 385/74
2010/0080563 A1 * 4/2010 DiFonzo et al. .............. 398/115
2011/0255873 A1 * 10/2011 Tang et al. .................... 398/136
2012/0141064 A1 * 6/2012 Walker ............................ 385/14
2012/0141132 A1 * 6/2012 Walker .......................... 398/116
2012/0177322 A1 * 7/2012 Schwandt et al. .............. 385/53
2012/0177325 A1 * 7/2012 Schwandt et al. .............. 385/57
2012/0182683 A1 * 7/2012 Schwandt et al. ....... 361/679.31
2012/0183259 A1 * 7/2012 Schwandt et al. .............. 385/57
2012/0183260 A1 * 7/2012 Schwandt et al. .............. 385/57
2012/0183261 A1 * 7/2012 Schwandt et al. .............. 385/75
2012/0183262 A1 * 7/2012 Schwandt et al. .............. 385/88

FOREIGN PATENT DOCUMENTS

TW 586645 5/2004
TW 201135473 10/2011

OTHER PUBLICATIONS

English language translation of abstract of TW 201135473 (published Oct. 16, 2011).
English language translation of abstract of TW 586645 (published May 1, 2004).

* cited by examiner

*Primary Examiner* — Kaveh Kianni
(74) *Attorney, Agent, or Firm* — McClure, Qualey & Rodack, LLP

(57) ABSTRACT

An active optical cable has a connector containing an electrical-to-optical and optical-to-electrical (EO/OE) conversion processing chip. The EO/OE conversion processing chip has a TXin+ pin and a TXin− pin to be coupled to a TX+ terminal and a TX− terminal of an USB connector of an apparatus. The pair of pins TXin+ and TXin−, for a differential transmission signal, are provided base on a common mode impedance structure, to charge capacitors carried by the TX+ and TX− terminals and, according to the charging status of the capacitors, it is determined whether the active optical cable is connected to the apparatus.

18 Claims, 8 Drawing Sheets

ACTIVE OPTICAL CABLE WITH AN ADDITIONAL POWER CONNECTOR, AND ELECTRONIC DEVICE USING THE SAME

CROSS REFERENCE TO RELATED APPLICATIONS

This Application claims priority of Taiwan Patent Application No. 100142881, filed on Nov. 23, 2011, the entirety of which is incorporated by reference herein.

BACKGROUND OF THE INVENTION

1. Field of the Invention

The present invention relates to an optical cable and an electronic device using an optical cable, and in particular relates to an active optical cable (AOC) equipped with an electrical-to-optical/optical-to-electrical (EO/OE) processing chip, and an electronic device using the active optical cable.

2. Description of the Related Art

A universal serial bus (USB) is commonly used in connection and communication between a host and a device, which operates at a high transmission rate. The transmission rate of conventional USB 2.0 specification is just 480 M bps. However, the USB 3.0 specification, developed from the USB 2.0 specification, operates at a transmission rate up to 5 Gbps.

In addition to a direct connection through the USB ports of the host and the device, the connection between the host and the device would be made by a cable which connects the USB ports of the host and the device. Generally, the cable is a copper cable. Note that for long-distance transmission (e.g., using a cable to connect a host to a projector and so on), the heavily used copper cable is too expensive and the transmitted signal would be attenuated through a long cable. Thus, a reliable cable is required for long-distance transmission.

BRIEF SUMMARY OF THE INVENTION

An active optical cable is disclosed, which comprises a first connector, a second connector and an optical cable. The first connector is operative to connect to a first apparatus. The second connector is operative to connect to a second apparatus. The optical cable connects the first connector to the second connector.

The first connector has a first electrical-to-optical and optical-to-electrical (EO/OE) conversion processing chip. The first EO/OE conversion processing chip has a first non-inverted transmit input-pin and a first inverted transmit input-pin, which are coupled to a first non-inverted transmit terminal and a first inverted transmit terminal of the first apparatus, respectively. A connection between the active optical cable and the first apparatus is recognized by charging a first capacitor carried by the first non-inverted transmit terminal and charging a second capacitor carried by the first inverted transmit terminal in a common mode impedance measurement.

In an exemplary embodiment, a first common impedance structure for the common mode impedance measurement provides a first resistor and a second resistor. The first resistor couples the first non-inverted transmit input-pin to ground. The second resistor couples the first inverted transmit input-pin to the ground.

An electronic device in accordance with an exemplary embodiment of the invention would comprise the first apparatus and the active optical cable.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

Figure 1A:
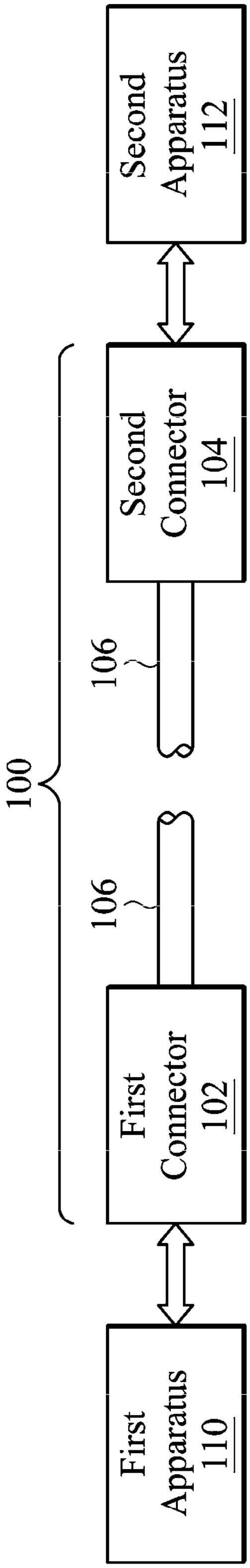
FIG. 1A and FIG. 1B and FIG. 1C illustrate an active optical cable in accordance with an exemplary embodiment of the invention.
Figure 1B:
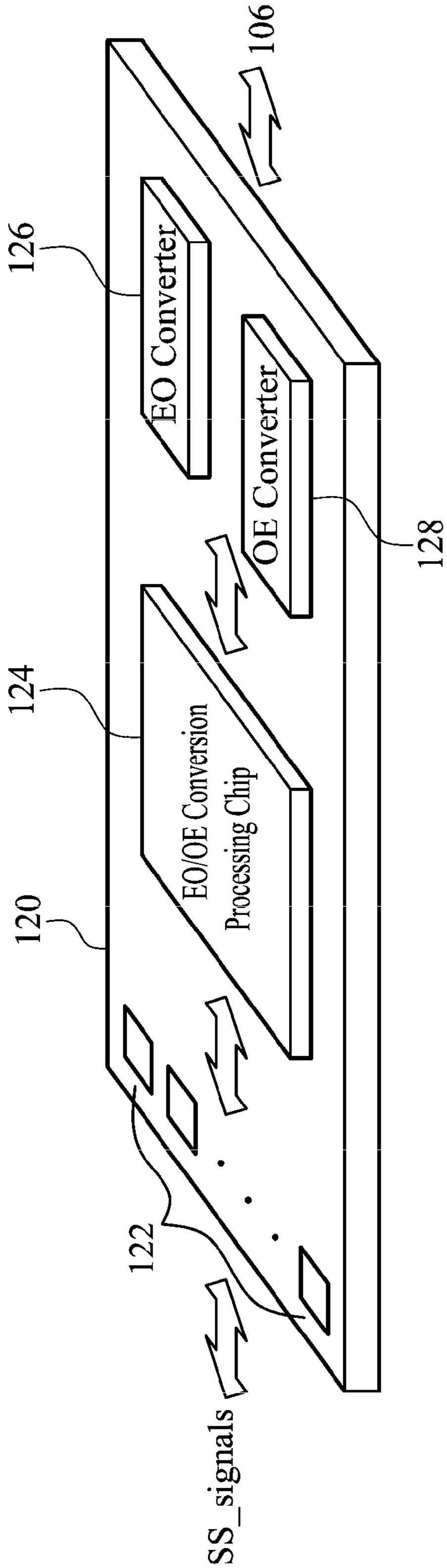
Figure 1C:
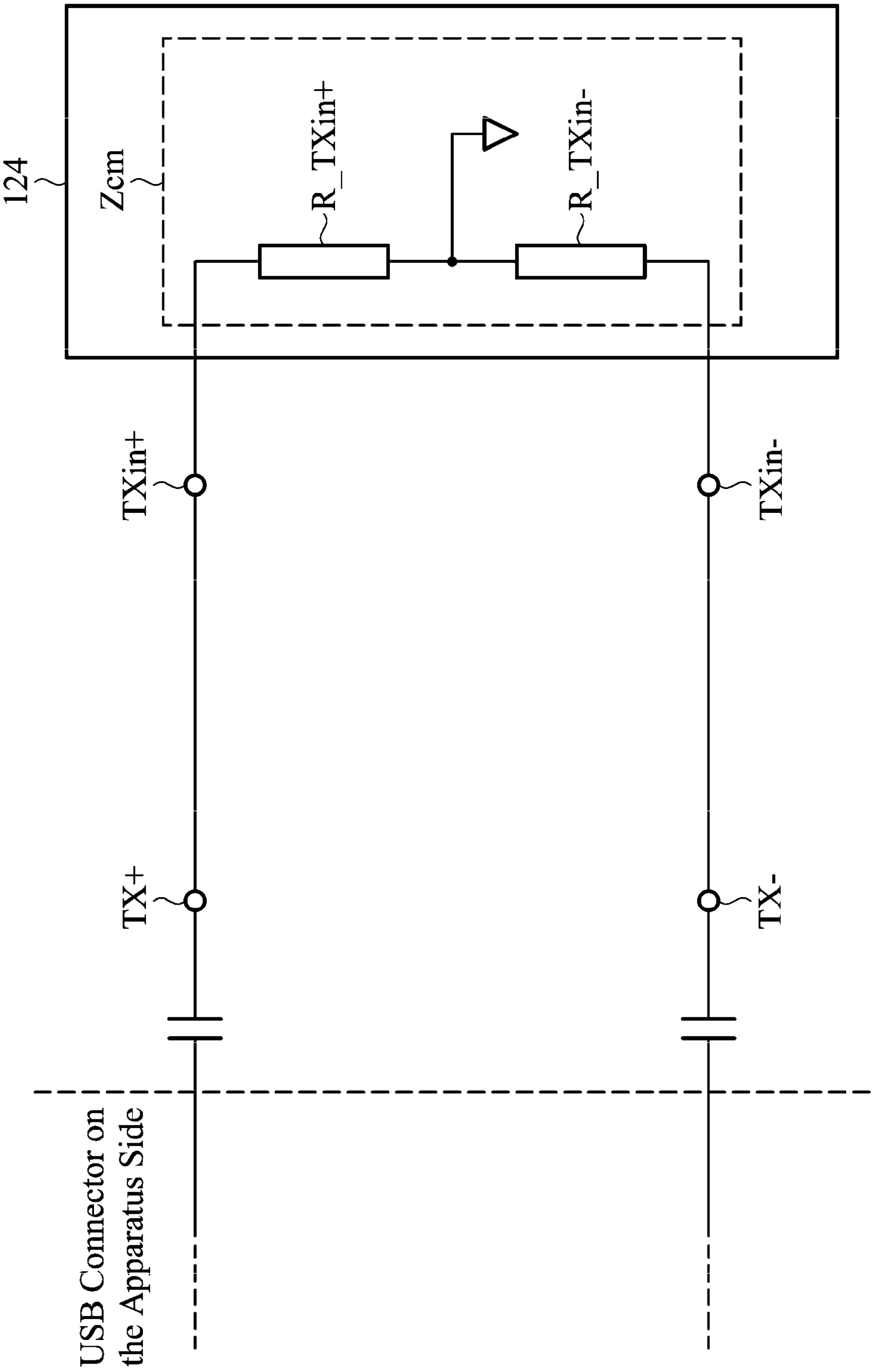

FIG. 1A, FIG. 1B and FIG. 1C depict an active optical cable in accordance with an exemplary embodiment of the invention.

Referring to FIG. 1A, an active optical cable 100 has a first connector 102, a second connector 104 and an optical cable 106. The first connector 102 is for connecting to a first apparatus 110. The second connector 104 is for connecting to a second apparatus 112. In an exemplary embodiment, one of the first and the second apparatuses would be regarded as a host side while the other apparatus is regarded as a device side. The host would be a server and so one. The device would be a projector or a hub device and so on. Through the cable 106, the first connector 102 is connected to the second connector 104. The connectors and the apparatuses would communicate through a USB interface. In an exemplary embodiment, the first connector 102 would connect to a first USB connector installed in the first apparatus 110. The second connector 104 would be connected to a second USB connector installed in the second apparatus 112. The connectors are not limited to being a plug or a socket. When the connector provided by the cable is a plug, the connector of the apparatus side is a socket. Conversely, when the connector provided by the cable is a socket, the connector of the apparatus side is a plug. Further, in an exemplary embodiment, the first apparatus 110 and the active optical cable 100 would be regarded as an electronic device, wherein the first apparatus 110 would act as a host defined in USB 3.0 specification and would transmit data to another apparatus (e.g. the second apparatus, external to the electronic device) through the active optical cable 100 at a high speed. In another exemplary embodiment, the second apparatus 112 and the active optical cable 100 would be regarded as an electronic device, wherein the second apparatus 112 would act as the device side defined in USB 3.0 specification and would transmit data, through the active optical cable 100 at high speed, to the apparatus (e.g. the first apparatus, external to the electronic device) at the other end of the cable.

Referring to FIG. 1B, the connector (the first connector 102 or the second connector 104) would contain a printed circuit board (PCB) 120. There are a plurality of contact pads, an electrical-to-optical and optical-to-electrical (EO/OE) conversion processing chip 124, an electrical-to-optical (EO) converter 126 and an optical-to-electrical (OE) converter 128 on the PCB 120. Note that the disclosed cable is named active optical cable because the optoelectronic elements, such as the EO/OE conversion processing chip 124, are equipped within the cable. Further, note that in comparison with conventional techniques which provide the EO/OE processing in the apparatus side, the disclosure utilizes the disclosed cable to provide the EO/OE processing design. Thus, it is not required to change or upgrade the hardware installed in the apparatus device for the rapid and long-distance data transmission through the disclosed active optical cable.

The contact pads 122 are coupled with the plurality of pins of the first connector 102 or the second connector 104. in an exemplary embodiment, the first connector 102 is the connector defined by USB 3.0 interface coupling to the first apparatus 110, and the plurality of contact pads 122 are coupled with a power line terminal (VBUS), a ground terminal (GND), a non-inverted transmit terminal (TX+), a inverted transmit terminal (TX−), a non-inverted receive terminal (RX+), a inverted receive terminal (RX−), a non-inverted data terminal (D+), an inverted data terminal (D−) and a data line ground (GND_DRAIN) of the first connector 102. The non-inverted transmit terminal (TX+) and inverted transmit terminal (TX−) are for carrying a differential transmitting signal for the USB 3.0 interface, and the non-inverted receive terminal RX+ and the inverted receive terminal RX− are for carrying a differential receiving signal for the USB 3.0 interface. Generally, in a USB 3.0 interface. The different transmit signal terminals (TX+ and TX−) and the differential receive signal terminals (RX+ and RX−) provide a full-duplex transmission, i.e. the signal transmitting and receiving procedures are allowed to be executed at the same time, and are independent of each other. Note that the non-inverted and inverted data terminals D+ and D− provided within the USB 3.0 interface support the differential signal required in USB 1.0 interface or USB 2.0 interface. The pair of differential data terminals D+ and D− work in a half-duplex mode—only one direction of communication is allowed at a time. Further, in another exemplary embodiment, it is not necessary to dispose contact pads for the non-inverted data terminal D+ and the inverted data terminal D−.

The contact pads 122 are further coupled to the EO/OE conversion processing chip 124. The EO/OE conversion processing chip 124 is further coupled to the EO converter 126 and the OE converter 128. The coupling between the abovementioned components would be implemented by PCB traces, wire bounding, or a soldering process, etc. Note that the contact pads, EO/OE conversion processing chip, EO converter and OE converter are not limited to be disposed on the same side of the PCB 120. Considering the space needs of the connectors, the aforementioned components would be separately arranged over the both sides of the PCB 120.

The EO converter 126 would be a light-emitting diode (e.g. a vertical cavity surface emitting laser diode, VCSEL.) The OE converter 128 would be a photodiode. The EO/OE conversion processing chip 124 would receive the SuperSpeed transmitting signals from the terminals TX+ and TX− of the USB connector on first apparatus 110 through the first connector 102 and the contact pads 122 and convert the content of the received signals for driving the EO converter (e.g. a photodiode) 126 to transmit the content in light. The optical signal generated by the EO converter 126 is output through an optical cable 106. As for the opposite direction of the signal transmission, the optical signal passed through the optical cable 106 would be converted to the electric signal through the OE converter (e.g. a photodiode) 128. After being processed by the EO/OE conversion processing chip 124, USB SuperSpeed signals are conveyed to the terminals RX+ and RX− of the USB connector on the first apparatus 110 through the contact pads 122 and the first connector 102.

The EO/OE conversion processing chip 124 has a plurality of pins corresponding to the contact pads 122, (corresponding to the pins of the USB connector of the apparatus side as well). Referring to FIG. 1C, the EO/OE conversion processing chip 124 has input pins TXin+ and TXin−, corresponding to the non-inverted transmit terminal TX+ and the inverted transmit terminal TX− of the USB connector (e.g. a USB 2.0 connector or a USB 3.0 connector) of the apparatus side, respectively. The input pin TXin+ and the input pin TXin− are for receiving a differential transmitting signal.

Note that FIG. 1C shows a special design for the input pins TXin+ and TXin− of the EO/OE conversion processing chip 124, which is operative to recognize the connection between the disclosed active optical cable and the apparatus side. As shown in FIG. 1C, a common mode impedance Zcm is obtained between the pair of input pins TXin+ and TXin− and within the EO/OE conversion processing chip 124. In accordance with the charging status of the capacitors carried by the non-inverted transmit terminal TX+ and the inverted transmit terminal TX− of the USB connector of the apparatus side, the connection status between the apparatus side and the active optical cable is identified. For example, when the active optical cable is connected to the connector of the apparatus side, the aforementioned capacitors provide at the apparatus side are electrically charged and, accordingly, it is determined that the optical cable is certainly connected to the apparatus side.

In detail, the exemplary embodiment of FIG. 1C shows that an equivalent circuit of the transmission structure between the first apparatus 110 and the EO/OE conversion processing chip 124 contains a resistor R_TXin+ and a resistor R_TXin−. The resistor R_TXin+ couples the non-inverted transmit input-pin TXin+ to ground. The resistor R_TXin− couples the inverted transmit input-pin TXin− to ground. In other words, the node coupling to the resistor R_TXin+ and the resistor R_TXin− is connected to ground. In this manner, a common mode impedance of the transmission structure is measured. The common mode impedance would be obtained by applying the same electric potentials to the transmit input-pins TXin+ and TXin−. And, at the meantime, the resistor R_TX+ and resistor R_TXin− are connected in parallel. When a positive voltage and a negative voltage of the same magnitude are supplied to the non-inverted transmit input-pin TXin+ and the inverted transmit input-pin TXin−, respectively, a differential mode impedance of the transmission structure is obtained. In this situation, the resistor R TXin+ and the resistor R_TXin− are connected in series. Note that the node between the resistor R TXin+ and the resistor R_TXin− is connected to the ground. Thus, therefore, when the optical cable is connected to an apparatus, the capacitors carried by the non-inverted transmit terminal TX+ and the inverted transmit terminal TX− of the USB connector of the apparatus are electrically charged. In this manner, when connecting the disclosed optical cable to an apparatus through a USB connector, the connection between the disclosed optical cable and the apparatus would be recognized via the common mode impedance Zcm of the transmission structure. The conventional cables (without the common mode impedance Zcm) are incapable of recognizing the connection between the cable and the apparatus, and thereby data transmission may fail.

Note that the design of FIG. 1B and FIG. 1C would be only used in the first connector 102 or the second connector 104, or, may be used in both the first and second connectors 102 and 104.

The appearance of the disclosed connector (the first connector 102 or the second connector 104 of FIG. 1A) would be designed as the common USB standard A plug, USB standard B plug, or USB micro-B plug.

Figure 2A:
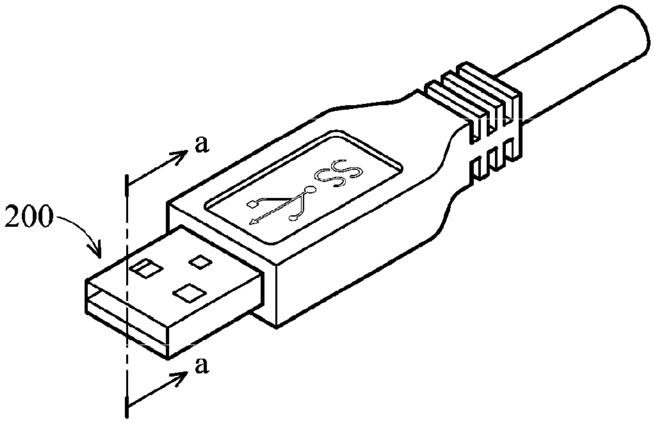
FIG. 2A and FIG. 2B show an exemplary embodiment of the invention, which utilizes a USB standard A plug to implement the connector of the active optical cable of the disclosure.
Figure 2B:
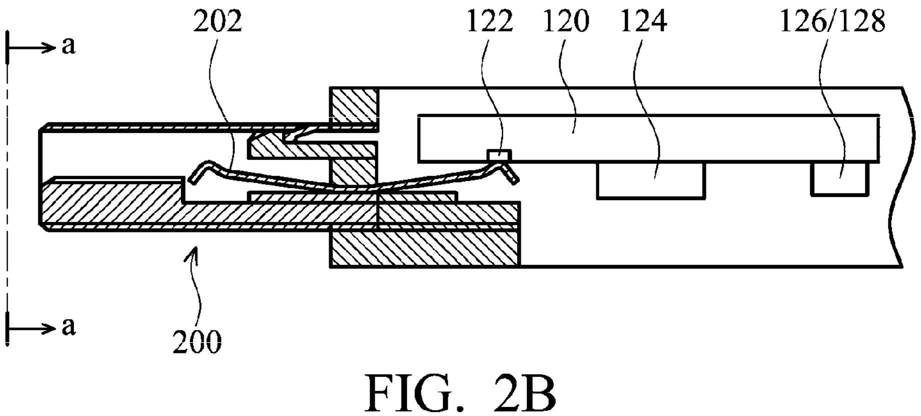

FIG. 2A and FIG. 2B illustrate an exemplary embodiment of the disclosed connector, which is designed according to a USB standard A plug. Referring to FIG. 2A, the appearance of the disclosed connector is designed as a common USB standard A plug. Following the line a, the cross section of the disclosed connector is shown in FIG. 2B. The contact pads 122 of the PCB 120 are connected to the pins of the plug structure 200 via a metal sheet 202, to connect to the USB connector of the apparatus side though the plug structure 200.

Figure 3A:
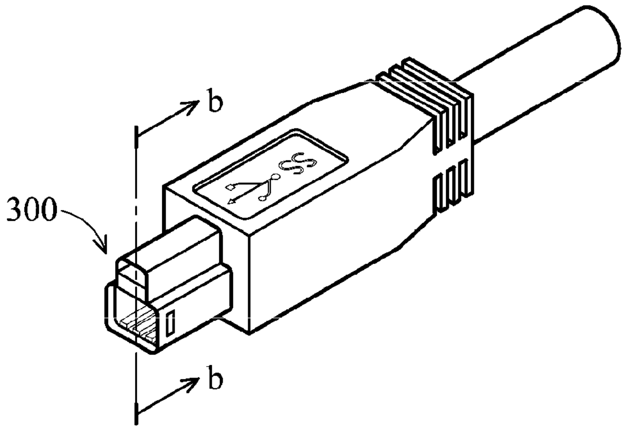
FIG. 3A and FIG. 3B show an exemplary embodiment of the invention, which utilizes a USB standard B plug to implement the connector of the active optical cable of the disclosure.
Figure 3B:
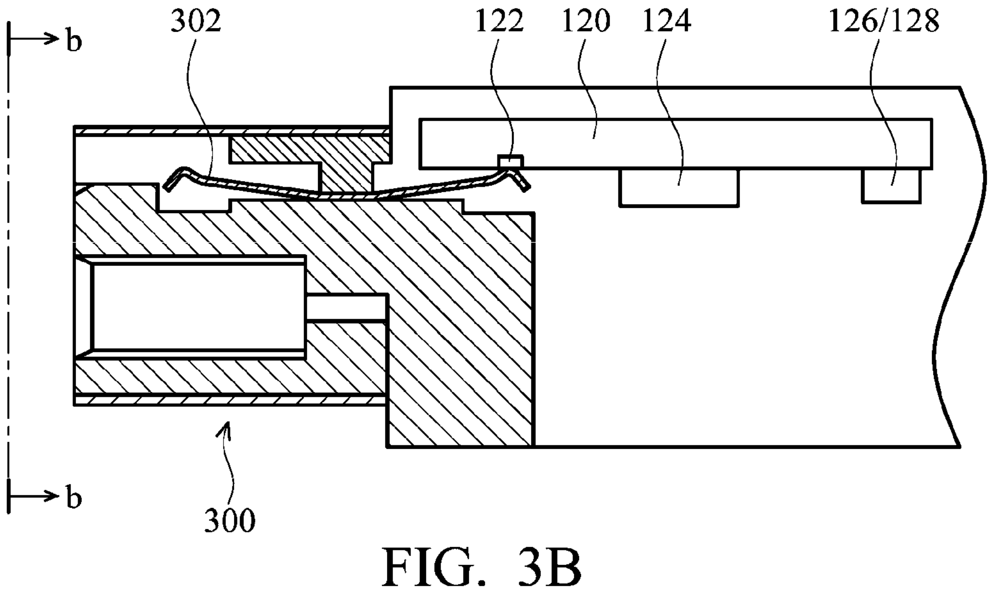

FIG. 3A and FIG. 3B illustrate an exemplary embodiment of the disclosed connector, which is designed according to a USB standard B plug. Referring to FIG. 3A, the appearance of the disclosed connector is designed as a common USB standard B plug. Following the line b, the cross section of the disclosed connector is shown in FIG. 3B. The contact pads 122 of the PCB 120 are connected to the pins of the plug structure 300 via a metal sheet 302, to connect to the USB connector of the apparatus side though the plug structure 300.

Figure 4A:
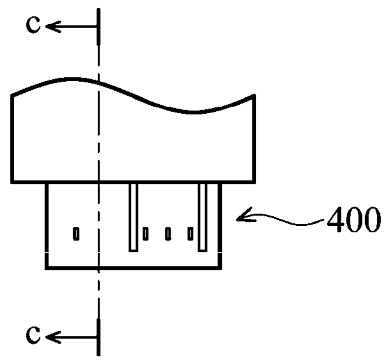
FIG. 4A and FIG. 4B show an exemplary embodiment of the invention, which utilizes a USB micro-B plug to implement the connector of the active optical cable of the disclosure.
Figure 4B:
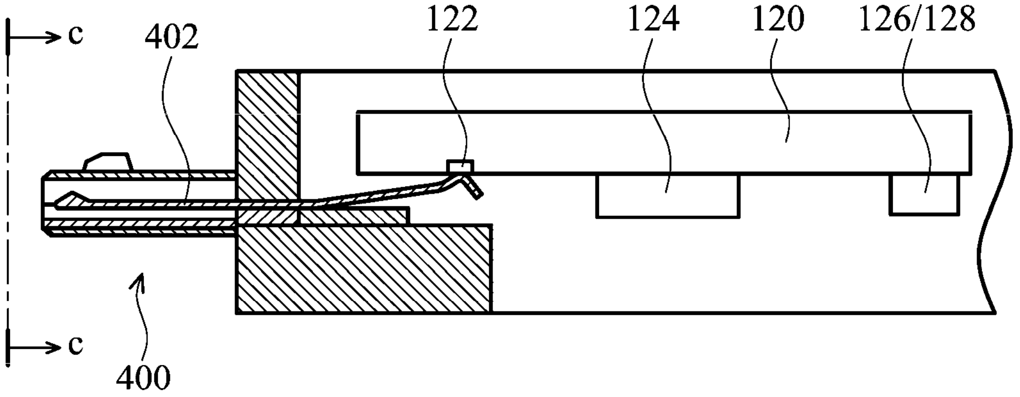

FIG. 4A and FIG. 4B illustrate an exemplary embodiment of the disclosed connector, which is designed according to a USB micro-B plug. Referring to FIG. 4A, the appearance of the disclosed connector is designed as a common USB micro-B plug. Following the line c, the cross section of the disclosed connector is shown in FIG. 4B. The contact pads 122 of the PCB 120 are connected to the pins of the plug structure 400 via a metal sheet 402, to connect to the USB connector of the apparatus side though the plug structure 400.

Note that the connection between the contact pads 122 of the PCB 120 and the plug structure (e.g. 200, 300, 400) is not limited to being implemented by the metal sheet (202, 302, 402), and would be implemented by a mating structure or by soldering.

Figure 5A:
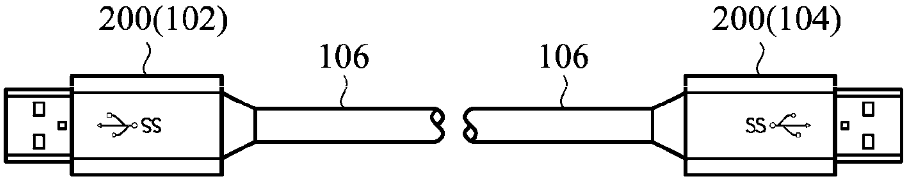
FIG. 5A, FIG. 5B and FIG. 5C illustrate several exemplary embodiments of the active optical cable of the disclosure.
Figure 5B:
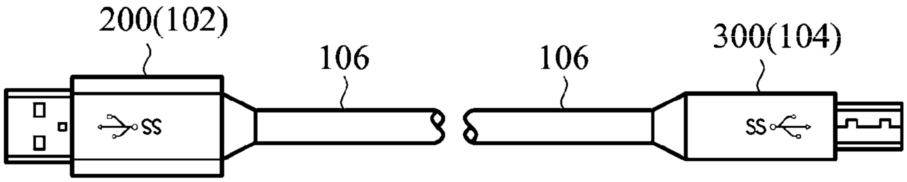
Figure 5C:
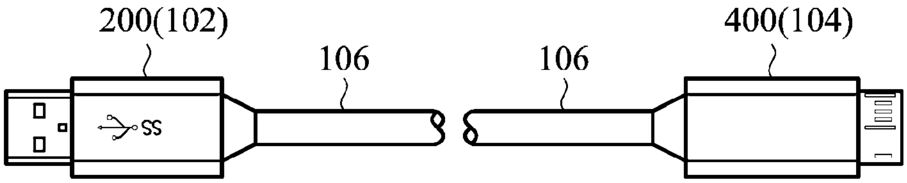

Referring back to FIG. 1A, the first apparatus 110 connected to the first connector 102 may be the host side, and second apparatus 112 connected to the second connector 104 may be a device side. FIG. 5A, FIG. 5B and FIG. 5C depict several exemplary embodiments of the disclosed active optical cable, which connects a host to a device. In FIG. 5A, the first connector 102 and the second connector 104 are both implemented according to the USB standard A plug 200. In FIG. 5B, the first connector 102 is implemented according to the USB standard A plug 200 while the second connector 104 is implemented according to the USB standard B plug 300. In FIG. 5C, the first connector 102 is implemented according to the USB standard A plug 200 while the second connector 104 is implemented according to the USB micro-B plug 400. Note that in these embodiments, each of the first and second connectors 102 and 104 contains the optoelectronic elements including the EO/OE conversion processing chip 124, for long distance and high speed data transmission.

Note that FIG. 5A, FIG. 5B and FIG. 5C are not intended to limit the active optical cable of the disclosure. Any optical cable with a connector implemented according to FIG. 1B and FIG. 1C involves the techniques of the disclosure.

The power source of the EO/OE conversion processing chip 124 is discussed below.

Figure 6:
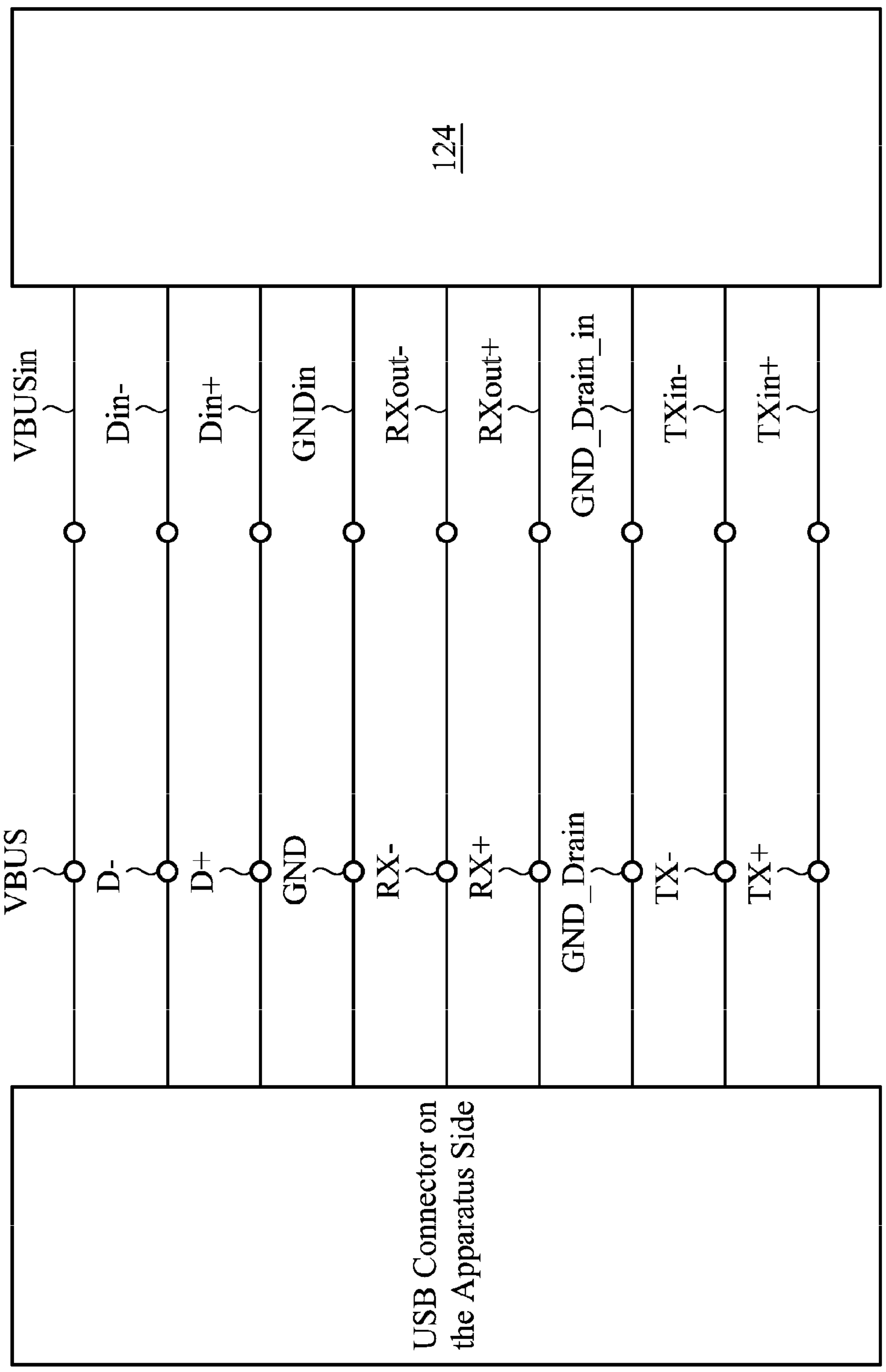
FIG. 6 shows the pins of a EO/OE conversion processing chip, designed for a USB 3.0 interface to be coupled to the USB connector of the device side.

FIG. 6 relates to a USB 3.0 interface, which illustrates that the pins of the EO/OE conversion processing chip 124 correspond to the pins of the USB connector of the apparatus side. As shown, a power line pin VBUSin corresponds to a power line terminal VBUS, an inverted data pin Din− corresponds to an inverted data terminal D−, a non-inverted data pin Din+ corresponds to a non-inverted data pin D+, a ground pin GNDin corresponds to a ground terminal GND, an inverted receive output-pin RXout− corresponds to an inverted receive terminal RX−, a non-inverted receive output-pin RXout+ corresponds to a non-inverted receive terminal RX+, a data line ground pin GND_DRAIN_in corresponds to a data line ground terminal GND_DRAIN, an inverted transmit input-pin TXin− corresponds to an inverted transmit terminal TX−, and a non-inverted transmit input-pin TXin+ corresponds to a non-inverted transmit terminal TX+. In one exemplary embodiment, the receive output-pin RXout means the pin of the EO/OE conversion processing chip 124 outputs the signal receiving from a host side (not shown) to the apparatus side. In one exemplary embodiment, the transmit input-pin TXin means the pin of the EO/OE conversion processing chip 124 is input the signal from the apparatus side and then transmitted to a host side (not shown). In another exemplary embodiment, it is not necessary to arrange the inverted and non-inverted data pins Din− and Din+ and the inverted and non-inverted data terminals D− and D+ corresponding thereto. As previously discussed, the connection between the disclosed active optical cable and an apparatus is obtained because a common mode impedance Zcm is built in the pair of transmit input pins TXin+ and TXin−.

Furthermore, when the first apparatus 110 is a host, the second apparatus 112 is a device, and the first apparatus 110 and the second apparatus 112 both are capable of supplying power, the second apparatus 112 would reversely transfer power, through the power line terminal VBUS of the USB connector thereof, to the power line pin VBUSin of the EO/OE conversion processing chip of the second connector 104 of the active optical cable 106 to supply power to the chip.

Figure 7:
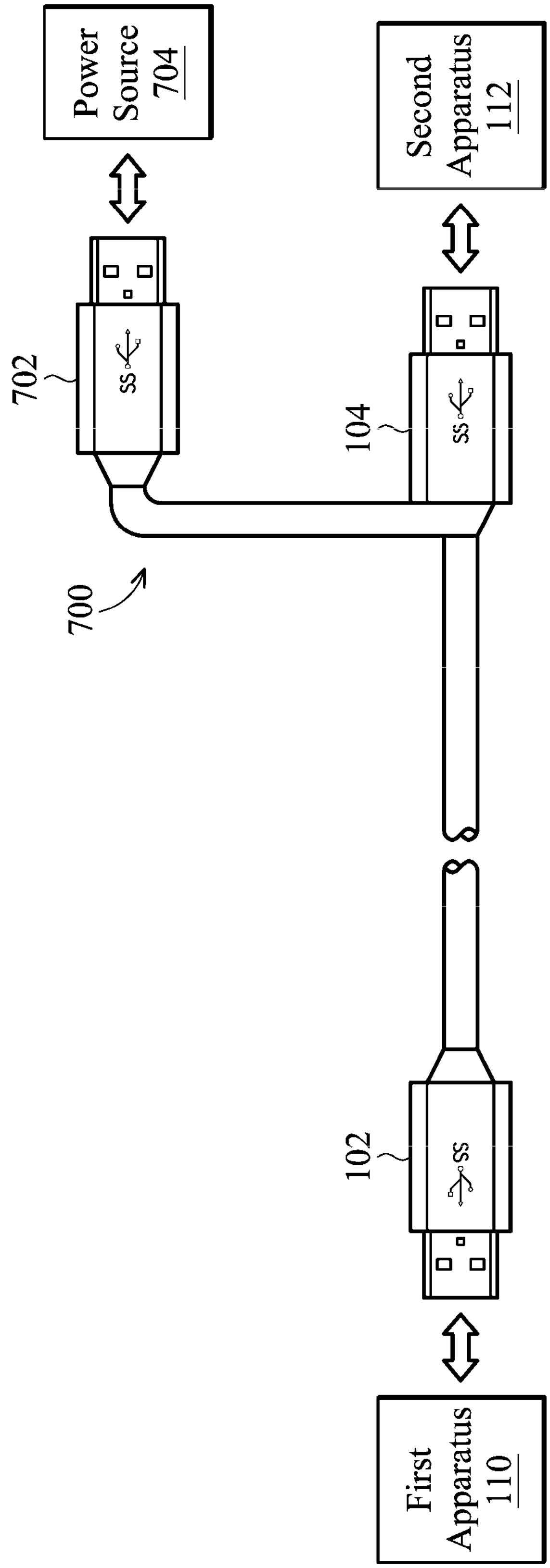
FIG. 7 depicts another design of the active optical cable of the disclosure, for connecting to a device which does not supply power to the cable.

FIG. 7 depicts another design of the disclosed active optical cable, to cope with a situation wherein the apparatus at one end of the cable is incapable of supplying power (in general, the device side does not supply power.) As shown, the second apparatus 112 connected with the second connector 104 does not supply power to the cable and, in addition to the active optical cable 106 having the first and second connectors 102 and 104, the V type optical cable disclosed in FIG. 7 further includes a power line 700 for providing a third connector 702. In detail, one end of the power line 700 is coupled to the second connector 104 while another end of the power line 700 is coupled to the third connector 702. The third connector 702 is for connecting to a power source 704, to supply power to the EO/OE conversion processing chip of the second connector 104.

In conclusion, the disclosure arranges the optoelectronic elements including the EO/OE conversion processing chip 124 on the cable side. For the user, long distance and high-speed data transmission is achieved by using the active optical cable of the disclosure rather than upgrading the hardware on the apparatus side. Furthermore, in the optical cable of the disclosure, a common mode impedance Zcm in the transmission structure is provided for recognizing the connection between the optical cable and the apparatus. Furthermore, in a case wherein the apparatus connected to one end of the optical cable does not supply power, a solution is proposed in the disclosure to drive the EO/OE processing chip.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An active optical cable, comprising:

a first connector, operative to connect to a first apparatus;

a second connector, operative to connect to a second apparatus; and an optical cable, connected between the first connector and the second connector, wherein:

the first connector has a first electrical-to-optical and optical-to-electrical conversion processing chip, the first electrical-to-optical and optical-to-electrical conversion processing chip has a first non-inverted transmit input-pin and a first inverted transmit input-pin for coupling to a first non-inverted transmit terminal and a first inverted transmit terminal of the first apparatus, respectively;

a connection between the active optical cable and the first apparatus is recognized by charging a first capacitor carried by the first non-inverted transmit terminal and charging a second capacitor carried by the first inverted transmit terminal in a common mode impedance measurement;

the first electrical-to-optical and optical-to-electrical conversion processing chip further including a first resistor and a second resistor for the common mode impedance measurement;

wherein the first resistor is directly connected between the first non-inverted transmit input-pin and a ground terminal; and wherein the second resistor is directly connected between the first inverted transmit input-pin and the ground terminal.

2. The active optical cable as claimed in claim 1, further comprising a third connector coupled to the first connector, wherein the third connector is coupled to a power source for supplying power to the first electrical-to-optical and optical-to-electrical conversion processing chip of the first connector.

3. The active optical cable as claimed in claim 1, wherein the first electrical-to-optical and optical-to-electrical conversion processing chip uses a power line pin to couple to a power line terminal of the first apparatus and thereby the first apparatus supplies power to the first electrical-to-optical and optical-to-electrical conversion processing chip of the first connector.

4. The active optical cable as claimed in claim 1, wherein the first non-inverted transmit terminal and the first inverted transmit terminal of the first apparatus are provided by a universal serial bus connector.

5. The active optical cable as claimed in claim 1, wherein:

the second connector has a second electrical-to-optical and optical-to-electrical conversion processing chip, and the second electrical-to-optical and optical-to-electrical conversion processing chip has a second non-inverted transmit input-pin and a second inverted transmit input-pin which are coupled to a second non-inverted transmit terminal and a second inverted transmit terminal of the second apparatus, respectively; and a connection between the active optical cable and the second apparatus is recognized, independent from optical transmission on the optical cable, by charging a third capacitor carried by the second non-inverted transmit terminal and charging a fourth capacitor carried by the second inverted transmit terminal in a common mode impedance measurement.

6. The active optical cable as claimed in claim 5, wherein a second common mode impedance structure for the common mode impedance measurement charging the third and fourth capacitors provides:

a third resistor, coupling the second non-inverted transmit input-pin to ground; and a fourth resistor, coupling the second inverted transmit input-pin to the ground.

7. The active optical cable as claimed in claim 5, wherein the second non-inverted transmit terminal and the second inverted transmit terminal of the second apparatus are provided by a universal serial bus port.

8. The active optical cable as claimed in claim 1, wherein the second connector has a second electrical-to-optical and optical-to-electrical conversion processing chip, and the active optical cable further comprises a third connector coupled to the second connector, and the third connector is coupled to a power source for supplying power to the second electrical-to-optical and optical-to-electrical conversion processing chip of the second connector.

9. The active optical cable as claimed in claim 1, wherein the second connector has a second electrical-to-optical and optical-to-electrical conversion processing chip and, the second electrical-to-optical and optical-to-electrical conversion processing chip uses a power line pin to couple to a power line terminal of the second apparatus and thereby the second apparatus supplies power to the second electrical-to-optical and optical-to-electrical conversion processing chip of the second connector.

10. The active optical cable as claimed in claim 1, wherein:

the first connector is a universal serial bus standard A plug; and the second connector is a universal serial bus standard A plug, a universal serial bus standard B plug or a universal serial bus micro-B plug.

11. An electronic device, comprising:

a first apparatus; and an active optical cable for connecting to a second apparatus external to the electronic device, the active optical cable comprising:

a first connector, operative to connect to the first apparatus;

a second connector, operative to connect to the second apparatus; and an optical cable, connected between the first connector and the second connector, wherein:

the first connector has a first electrical-to-optical and optical-to-electrical conversion processing chip, the first electrical-to-optical and optical-to-electrical conversion processing chip has a first non-inverted transmit input-pin and a first inverted transmit input-pin for coupling to a first non-inverted transmit terminal and a first inverted transmit terminal of the first apparatus, respectively;

a connection between the active optical cable and the first apparatus is recognized by charging a first capacitor carried by the first non-inverted transmit terminal and charging a second capacitor carried by the first inverted transmit terminal in a common mode impedance measurement;

the first electrical-to-optical and optical-to-electrical conversion processing chip further including a first resistor and a second resistor for the common mode impedance measurement;

wherein the first resistor is directly connected between the first non-inverted transmit input-pin and a ground terminal; and wherein the second resistor is directly connected between the first inverted transmit input-pin and the ground terminal.

12. The electronic device as claimed in claim 11, wherein the active optical cable further comprises a third connector coupled to the first connector, wherein the third connector is coupled to a power source for supplying power to the first electrical-to-optical and optical-to-electrical conversion processing chip of the first connector.

13. The electronic device as claimed in claim 11, wherein the first electrical-to-optical and optical-to-electrical conversion processing chip uses a power line pin to couple to a power line terminal of the first apparatus and thereby the first apparatus supplies power to the first electrical-to-optical and optical-to-electrical conversion processing chip of the first connector.

14. The electronic device as claimed in claim 11, wherein:

the second connector has a second electrical-to-optical and optical-to-electrical conversion processing chip, and the second electrical-to-optical and optical-to-electrical conversion processing chip has a second non-inverted transmit input-pin and a second inverted transmit input-pin which are coupled to a second non-inverted transmit terminal and a second inverted transmit terminal of the second apparatus, respectively; and a connection between the active optical cable and the second apparatus is recognized, independent from optical transmission on the optical cable, by charging a third capacitor carried by the second non-inverted transmit terminal and charging a fourth capacitor carried by the second inverted transmit terminal in a common mode impedance measurement.

15. The electronic device as claimed in claim 14, wherein a second common mode impedance structure for the common mode impedance measurement charging the third and fourth capacitors provides:

a third resistor, coupling the second non-inverted transmit input-pin to ground; and a fourth resistor, coupling the second inverted transmit input-pin to the ground.

16. The electronic device as claimed in claim 11, wherein the second connector has a second electrical-to-optical and optical-to-electrical conversion processing chip, and the active optical cable further comprises a third connector coupled to the second connector, wherein the third connector is coupled to a power source for supplying power to the second electrical-to-optical and optical-to-electrical conversion processing chip of the second connector.

17. The electronic device as claimed in claim 11, wherein the second connector has a second electrical-to-optical and optical-to-electrical conversion processing chip, and the second electrical-to-optical and optical-to-electrical conversion processing chip uses a power line pin to couple to a power line terminal of the second apparatus and thereby the second apparatus supplies power to the second electrical-to-optical and optical-to-electrical conversion processing chip of the second connector.

18. The electronic device as claimed in claim 12, wherein:

the first connector is a universal serial bus standard A plug; and the second connector is a universal serial bus standard A plug, a universal serial bus standard B plug or a universal serial bus micro-B plug.

* * * * *